United States Patent [19]

Fujimoto

[11] Patent Number: 4,549,508
[45] Date of Patent: Oct. 29, 1985

[54] TWO-CYCLE INTERNAL COMBUSTION ENGINE

[75] Inventor: Hiroaki Fujimoto, Hamamatsu, Japan

[73] Assignees: Yamaha Hatsudoki Kabushiki Kaisha, Iwata; Sanshin Kogyo Kabushiki Kaisha, Hamamatsu, both of Japan

[21] Appl. No.: 475,183

[22] Filed: Mar. 14, 1983

[30] Foreign Application Priority Data

Mar. 31, 1982 [JP] Japan .................................. 57-52685

[51] Int. Cl.⁴ ........................ F02B 33/04; F02B 23/08
[52] U.S. Cl. ............................ 123/73 PP; 123/193 P; 123/193 H; 123/661
[58] Field of Search ........... 123/193 R, 193 H, 193 P, 123/661, 671, 657, 73 PP

[56] References Cited

U.S. PATENT DOCUMENTS

| | | | |
|---|---|---|---|
| 2,305,208 | 12/1942 | Trammell et al. | 123/661 |
| 4,176,631 | 12/1979 | Kanao | 123/73 PP |
| 4,300,499 | 11/1981 | Nakanishi et al. | 123/661 |
| 4,344,408 | 8/1982 | Inoue et al. | 123/661 |
| 4,421,081 | 12/1983 | Nakamura et al. | 123/661 |

FOREIGN PATENT DOCUMENTS

| | | | |
|---|---|---|---|
| 2607561 | 1/1977 | Fed. Rep. of Germany | 123/661 |
| 236103 | 6/1945 | Switzerland | 123/661 |

*Primary Examiner*—Craig R. Feinberg
*Attorney, Agent, or Firm*—Ernest A. Beutler

[57] ABSTRACT

An improved combustion chamber configuration for a two-cycle engine that improves combustion and running at both idle and high speed. The combustion chamber comprises a first portion that communicates with a spark plug and has a relatively small volume. The first portion communicates with a second larger volume portion that has a decreasing cross-sectional area as approaching the exhaust port so as to insure complete flame propagation even at high engine speeds.

3 Claims, 4 Drawing Figures

TWO-CYCLE INTERNAL COMBUSTION ENGINE

This invention relates to a two-cycle internal combustion engine and more particularly to an improved combustion chamber configuration for such as engine.

As is well known, two-cycle engines do not run particularly well at low speeds. Under low speed running, even the most effective scavenging system causes a fairly substantial amount of exhaust gases to remain in the chamber at the time the spark plug is fired for the next cycle. As a result, there is rather poor combustion and irregular running under these conditions.

A combustion chamber configuration and port orientation as shown in FIG. 1 has been proposed to improve running conditions in two-cycle engines at low speeds even if the scavenging efficiency is not 100%. With such an arrangement, a relatively small volume area is positioned in proximity to the intake or scavenge port and the spark plug is positioned within this cavity. This cavity communicates with a larger cavity which is placed in proximity to the exhaust port. With this type of combustion chamber configuration, the small combustion area adjacent the spark plug is effectively scavenged at even low speeds so as to provide good combustion. The flame front propagates into the larger volume area and will insure combustion of the unburned gas of the fresh charge in this area. However, the arrangement as used in the prior art provides a rather substantial volume and long flame travels. Therefore, less than optimum efficiency is provided with this type of prior art arrangement at high engine speeds.

Referring now specifically to FIG. 1, a single cylinder of a two-cycle engine constructed in accordance with the prior art is shown in cross-section and is identified generally by the reference numeral 11. The engine 11 includes a cylinder block 12 in which a cylinder bore 13 is formed. A piston 14 reciprocates in the cylinder bore 13 and is connected to a crankshaft (not shown) by means of a connecting rod 15 in a known manner.

The cylinder head 16 is affixed to the cylinder block 12 and defines a combustion chamber with the curved head 17 of the piston when it is at its top dead center position. This combustion chamber consists of a first relatively small volume 18 that is defined in part by a cylinder head surface 19. The combustion chamber portion 18 is disposed on the side of the cylinder bore 13 where the discharge of one or more scavenge ports 21 is directed. A spark plug 22 is positioned with its gap in the combustion chamber portion 18.

A second, substantially larger volume combustion chamber portion 23 communicates with the portion 18 at one side thereof and is defined by a cylinder head wall 24. The portion 23 is on the side of the cylinder bore 13 adjacent an exhaust port 25.

With the prior art type of arrangement as illustrated in FIG. 1, the intake charge is transferred to the area above the piston head 17 when the piston head uncovers the scavenge port 21. This inlet charge will flow generally upwardly along the side of the cylinder 13 opposite to the exhaust port 25. As the piston 14 approaches its top dead center position, the inlet air charge will be forced at a relatively high velocity into the larger volume portion 23. Any residual exhaust gases will be in this area. When the spark plug 22 is fired, its gap will be surrounded by a fresh fuel air charge, even at low speeds, so that ignition is insured. However, it should be noted that the larger portion of the volume 23 is remotely positioned from the spark gas so that incomplete combustion may well occur due to the long flame travel required. This incomplete combustion will, of course, be particularly prevalent at high speeds when the time for combustion is the least but it may also occur at low speeds.

It is, therefore, a principal object of this invention to provide an improved combustion for two-cycle engines.

It is another object of this invention to provide an improved combustion chamber configuration that results in improved running under all conditions.

SUMMARY OF THE INVENTION

This invention is adapted to be embodied in a combustion chamber for an internal combustion engine having a first portion of relatively small volume and a second portion of larger volume that communicates at one side thereof with one side of the first portion. A spark plug is positioned with its gap in the first portion. In accordance with the invention, the cross-sectional area of the second portion decreases toward the side opposite to that that communicates with the first portion.

DETAILED DESCRIPTION OF THE PREFERRED EMBODIMENT

Figure 2:
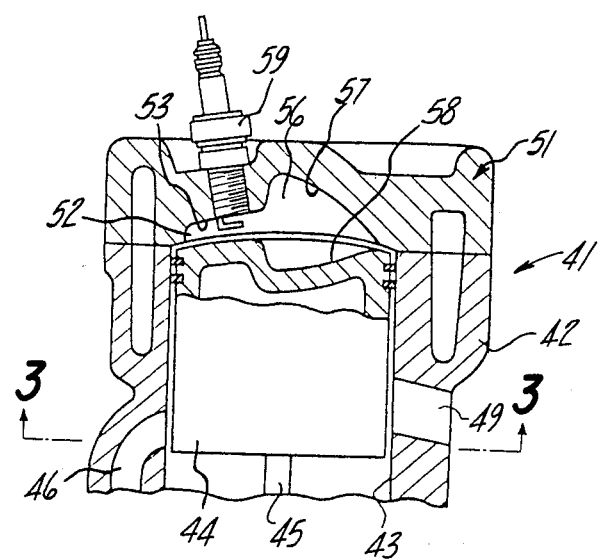
FIG. 2 is a cross-sectional view taken through a single cylinder of a two-cycle engine constructed in accordance with an embodiment of the invention.
Figure 3:
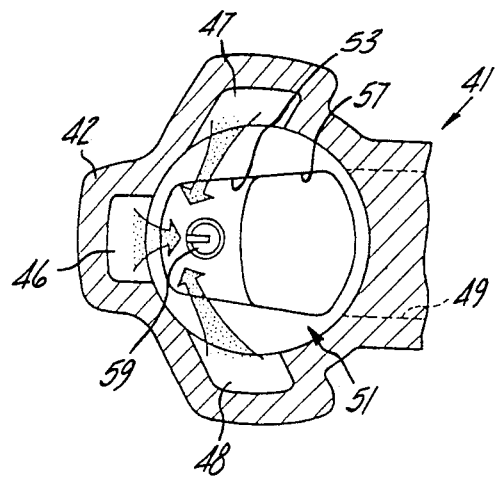
FIG. 3 is a cross-sectional view taken along the line 3—3 of FIG. 2

In FIGS. 2 and 3, a two-cycle internal combustion engine constructed in accordance with an embodiment of the invention is identified generally by the reference numeral 41. The engine 41 includes a cylinder block 42 in which a cylinder bore 43 is formed. A piston 44 is supported for reciprocation within the cylinder bore 43 and is connected to a crankshaft (not shown) by a connecting rod 45 in a known manner.

A center scavenge port 46 extends through the cylinder block 42 from the crankcase and terminates in a port formed in the cylinder bore 43 that is sequentially opened and closed during the reciprocation of the piston 44. On either side of the scavenge port 46 there are formed a pair of inclined scavenge ports 47 and 48 which also extend from the crankcase into the cylinder wall 43 so as to be opened and closed by the reciprocation of the piston 44. The ports 46, 47 and 48 are oriented so that the intake charge delivered by them during the time they are opened by the piston 44 will flow generally along the side of the cylinder bore where the port 46 lies, as shown by the arrows in FIG. 3.

As exhaust port 49 extends through the cylinder wall 42 from the cylinder bore 43 on the side diametrically opposite to the scavenge port 46. Exhaust gases will be transferred through the exhaust port 49 to a suitable exhaust system in a known manner.

A cylinder head, indicated generally by the reference numeral 51, is affixed to the cylinder block 41 in a known manner. The cylinder head 51 has a first recess 52 that is defined by a surface 53 and which cooperates with the head of the piston 44 when it is in a top dead center position to provide a first combustion chamber portion. This portion 52 is disposed on the side of the cylinder bore 43 where the intake or scavenge ports 46, 47 and 48 direct their flow.

A second substantially larger combustion chamber volume 56 is formed at the opposite side of the portion 52 by means of a cylinder head surface 57 and a corresponding recess 58 formed in the head of the piston 44. It will be noted from FIG. 2 that the cross-sectional area of the portion 56 is substantially greatest in a plane parallel to the axis of the cylinder bore 43 immediately adjacent its point of communication with the portion 52. This cross-sectional area decreases in planes that are parallel to this plane but disposed at progressively closer distances to the exhaust port 49. The reason for this will become apparent shortly.

A spark plug 59 is positioned in the cylinder head 51 and communicates with the recess 52 at approximately its midpoint. The spark plut 59 is fired by an appropriate circuit in any known manner.

During running of the engine 41, when the the piston 44 moves downwardly to uncover the scavenge ports 46, 47 and 48, a fresh fuel air charge will be transferred to the area above the piston. This charge, as has been noted, will flow upwardly along the side of the cylinder bore 43 opposite to the exhaust port 49. At the same time, exhaust gases from the previous cycle will be purged and driven out through the exhaust port 49.

As the piston 44 moves upwardly, it will close off first the scavenge ports 46, 47 and 48 and then the exhaust port 49. When the piston 44 reaches its top dead center position, the combustion chamber portion 52 will have been scavenged of all residual exhaust gases from the previous cycle, even at low speeds. Thus, when the spark plug 59 is fired, there will be rapid and stable combustion occurring in the combustion engine portion 52.

As the flame propagates across the portion 52, it will move into the portion 56. Since the cross-sectional area of the portion 56 decreases on the side away from the spark plug 59 and toward the exhaust port 42, the rapid flame propagation will continue and it will be insured that complete combustion occurs even when running under high speeds.

Figure 1:
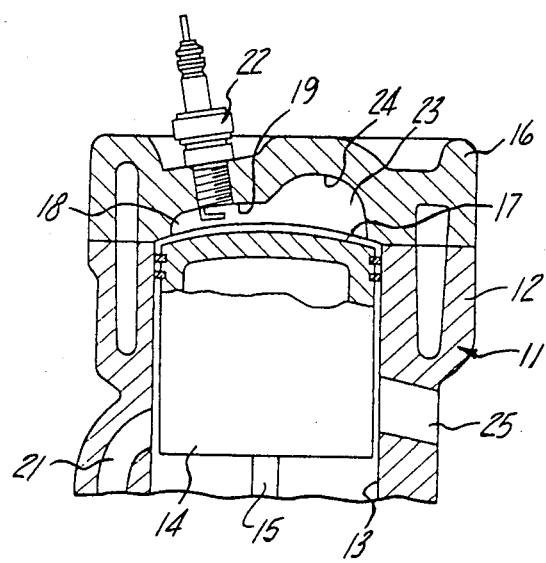
FIG. 1 is a cross-sectional view taken through the single cylinder of a two-cycle engine constructed in accordance with the prior art as aforedescribed.
Figure 4:
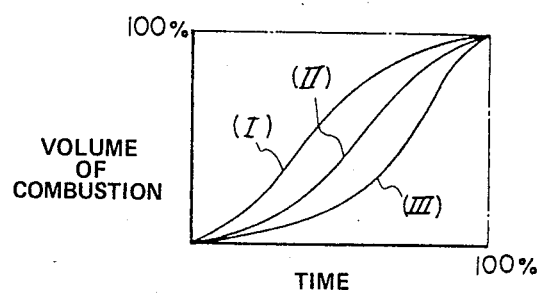
FIG. 4 is a graphical representation showing how the combustion chamber of the present invention improves combustion.

The effectiveness of the combustion chamber configuration in accordance with this invention in insuring complete combustion may be best understood by reference to FIG. 4, which a graphical analysis showing time on the abscissa and percentage of volume of the gases in the combustion engine which are burned on the ordinate. The curve I represents the combustion characteristics of an engine having a combustion chamber in accordance with this invention, the curve II represents the combustion characteristics of an engine having a conventional combustion chamber that is generally uniform in configuration and the curve III indicates the combustion characteristics of an engine having a combustion chamber constructed in accordance with the prior art construction as shown in FIG. 1.

It should be readily apparent that the instant combustion chamber provides a substantially higher degree of combustion of the gases in the chamber at a given time period and specifically promotes combustion over the earlier portion of the burning cycle so that it can be insured that complete combustion will occur even at high speed. In addition, this combustion chamber provides the efficiency of good combustion at idle which was provided by the combustion chamber of the type shown in FIG. 1. However, as has been noted, the combustion chamber constructed in accordance with the configuration shown in FIG. 1 has a tendency to provide incomplete combustion under high speeds due to the long flame travel required. With the instant combustion chamber, the spark plug is positioned relatively centrally of the small volume area of the combustion chamber but the small volume area communicates with the larger volume area where it has a maximum cross-section and at the midpoint of the larger area. The cross-section decreases toward the exhaust port so as to insure uniform and good combustion throughout the combustion chamber.

In addition to the configuration of the combustion chamber shown in FIGS. 2 and 3, it is to be understood that this invention can be used with chambers having other configurations so long as the basic principle of reducing the cross-sectional area toward the exhaust port is employed. For example, the shape of the combustion chamber can be configured to be generally conical. Various other changes and modifications may be made without departing from the spirit and scope of the invention, as defined by the appended claims.

I claim:

1. In a combustion chamber for a two-cycle internal combustion engine having a cylinder, a cylinder head and a reciprocating piston defining a variable volume combustion chamber comprised at minimum volume conditions of a first portion of relatively small volume formed in said cylinder head formed from a pair of generally flat side walls and a substantially rectangular planar top wall forming an open channel groove shape having an inlet end and an opposed outlet end surrounded on all sides but its outlet end by a squish area and a second portion of larger volume communicating at one side thereof with the outlet end of said first portion, a spark plug carried by said cylinder head with its gap in said first portion, scavenge port means in said cylinder for admitting a charge to said combustion chamber and configured to direct said charge toward the inlet end of said first portion, said second portion having its largest cross-sectional area adjacent said outlet end of said first portion, said largest cross-sectional area having an area greater than said outlet end and the cross-sectional area of said second portion continuously decreasing toward a side opposite the one side that communicates with said first portion.

2. In a combustion chamber as set forth in claim 1 further including an exhaust port positioned on the side oppsite to that with which the scavenge port means directs the charge.

3. In a combustion as set forth in claim 1 wherein the second portion of the combustion chamber is defined by a recess in the cylinder head and a complementary shaped recess formed in a head of the piston.

* * * * *